July 12, 1938.   R. B. HUNTER   2,123,729
ILLUMINATION CONTROL SYSTEM
Filed Jan. 28, 1937

Inventor
Richard B. Hunter
By Frank H. Hubbard
Attorney

Patented July 12, 1938

2,123,729

UNITED STATES PATENT OFFICE 2,123,729

ILLUMINATION CONTROL SYSTEM

Richard B. Hunter, Shorewood, Wis., assignor to Cutler-Hammer, Inc., Milwaukee, Wis., a corporation of Delaware Application January 28, 1937, Serial No. 122,721

11 Claims. (Cl. 175—312)

This invention relates to control systems for alternating current load circuits and more particularly to improvements in illumination control systems employing reactor type dimming devices.

In theater lighting it is frequently required to suddenly black out the lights from a given intensity of illumination thereof and subsequently to restore them quickly to the same or a different predetermined illumination intensity, to enhance certain dramatic effects, for instance. This is accomplished ordinarily by opening and closing the lamp circuit, as it is usually desired to preserve the instant setting of the intensity control instrumentalities. Moreover, operation of the usual intensity control instrumentalities in an attempt to obtain the aforementioned effect would necessarily result only in a gradual decrease of the illumination intensity to black out and/or a gradual increase to the desired intensity.

However, in control systems employing reactor type dimming devices, when the continuity of the lamp circuit is interrupted and subsequently completed, the illumination intensity first appreciably exceeds and then reduces to and stabilizes at the desired value. This sudden overshooting and subsequent dimming of the illumination intensity is alike annoying and distracting to audiences and to performers.

It has been attempted to remedy this condition by interrupting simultaneously the circuit of the reactor control winding and the lamp circuit, but while this procedure effectively eliminates overshooting of the illumination intensity, an appreciable interval is required for the illumination intensity to increase from black out to the desired value. This slow, gradual attainment of a predetermined illumination intensity is also objectionable in many cases.

It is an object of the present invention to provide an illumination control system of a character whereby the aforenoted objections are overcome.

Another and more specific object of the invention is to provide a control system of the aforementioned character having means whereby a substantially instantaneous transition from a prevailing intensity of illumination to black out may be effected and means whereby the same or a different intensity may subsequently be attained, relatively quickly and exactly, or substantially exactly.

Various other objects and advantages of the invention will hereinafter appear.

The accompanying drawing illustrates an embodiment of the invention which will now be described, it being understood that the embodiment illustrated is susceptible of modification without departing from the spirit and scope of the appended claims.

Figure 1:
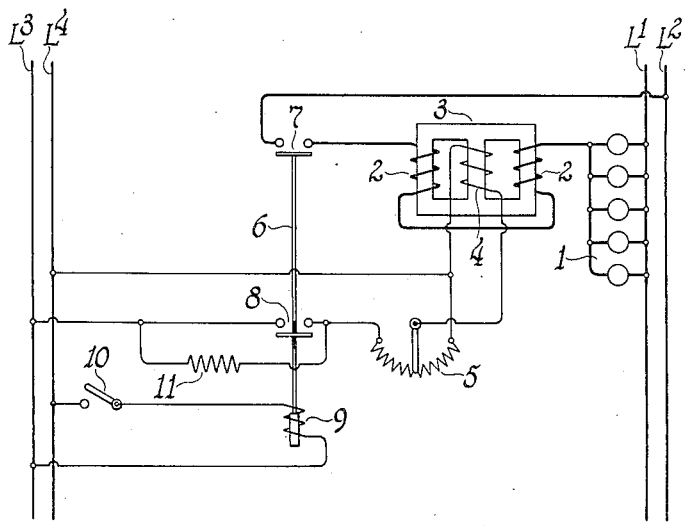
Figure 1 is a schematic and diagrammatic showing of a simple illumination control system of the reactor type embodying my invention.

Referring to Fig. 1 of the drawing, there is shown a group of lamps 1 which is connected to a source of alternating current, the terminals of which are represented by lines $L^1$, $L^2$. The lamps 1 are connected in series with the coils 2—2 of a variable reactor 3 of suitable design. Reactor 3 has a control winding 4 associated therewith which is supplied from a source of direct current or of alternating current of relatively low frequency, lines $L^3$ and $L^4$ representing the terminals of said source. As is well known, variations of the current in such control winding produce variations in the voltage drop in the reactor and thus variations of the lamp voltage.

The current in the control winding 4 is controlled by a potentiometer 5, although it is to be understood that any other suitable or well known means of control may be employed.

An electromagnetically operable switch 6 is provided with normally open contacts 7 and 8 which control the continuity of circuit of the lamps 1 and control winding 4, respectively. Energization and de-energization of the operating winding 9 of switch 6 is controlled by a manually operable switch 10. Where a plurality of individually controllable lamp circuits are employed, the control afforded by switch 6 might be relayed in a well-known manner to a master switch.

A resistance 11 is connected in parallel with the contacts 8 of switch 6 and in series with the potentiometer 5. As will be understood from the more specific description which follows, resistance 11 prevents appreciable overshooting of a predetermined illumination intensity and provides for rapid attainment of such intensity. The value of resistance 11 should preferably be about four times the resistance of the reactor control winding 4, but satisfactory results are obtained with a resistance 11 having an ohmic value selected from a range of from one and one-half to ten times the ohmic value of said winding 4. It may be stated generally that the higher the value of resistance 11, the less tendency there will be for the illumination intensity to exceed a desired predetermined value following closure of the contacts of switch 6, but the length of time required for the intensity to attain such value will be relatively greater than if a lower value of resistance 11 were employed. Thus I have found in actual practice that by employing a resistance 11 of the proper relative value (as determined by the particular conditions obtaining in the lamp circuit) a desired predetermined illumination intensity may be attained very rapidly without exceeding or appreciably exceeding such intensity.

However, since the effects of intensity overshooting and the rate of attainment of a desired predetermined intensity are effects which are to be measured by observation, slight overshooting of a desired predetermined intensity or slight variations in the rate of attainment of such intensity are substantially unapparent to the observer and thus are not objectionable. It is therefore evident that the value of resistance 11 is not required to be exact but may vary over a considerable range as hereinbefore stated.

The control system illustrated in Fig. 1 is representative of the usual reactor type illumination control system. The illumination intensity of the lamps 1 is controlled in a characteristic manner by adjustment of potentiometer 5, assuming closure of switch 10 and consequent closure of contacts 7 and 8 of switch 6. When a sudden transition from the prevailing intensity to black out is desired, switch 10 is opened, effecting deenergization of winding 9 and opening of contacts 7 and 8 of switch 6, thus deenergizing the circuit of the group of lamps 1 and considerably reducing the energization of the control winding 4. When it is subsequently desired to attain the same or a different illumination intensity of the lamps, depending upon whether or not the adjustment of the potentiometer has been changed in the meantime, winding 9 is energized by closure of switch 10 to effect closure of switch contacts 7 and 8. The group of lamps 1 and control winding 4 are thus energized simultaneously, and due to the action of the resistance 11 the desired illumination intensity is attained quickly and exactly, as indicated by the solid line A of the graph, Fig. 2.

Figure 2:
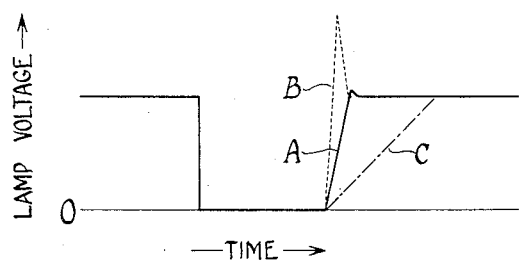
Fig. 2 illustrates graphically in dotted lines and in dot and dash lines, respectively, characteristic examples of the hereinbefore noted objectionable results, and in solid lines a characteristic example of the results obtained with my invention.

The dotted line B in Fig. 2 indicates the momentary overshooting of the desired illumination intensity when the circuit of the groups of lamps 1 only is interrupted and subsequently completed. The dot and dash line C indicates the relatively slow intensity rise which obtains when both the circuit of the group of lamps 1 and the circuit of control winding 4 are simultaneously and completely interrupted and subsequently completed, but without employing the resistance 11 in the circuit of control winding 4.

The following is believed to be an explanation of the cause of the aforementioned intensity overshooting. When both the control winding flux and the alternating current flow are flowing in the reactor core the actual flux at any instant is the resultant of the superimposition of the alternating current flux on the control winding flux. Then when the alternating current flux is removed without changing the control winding excitation, the value of the control winding flux rises due to the well known saturation effect. When the lamp circuit is again closed and the alternating current flux is superimposed on the control winding flux, the latter flux decays, but not instantaneously. Consequently the lamp voltage first exceeds the predetermined value and then decreases to and stabilizes at such value.

Moreover, it is obvious that by actually opening the control winding circuit and by opening the alternating current circuit simultaneously all flux in the reactor core is removed. Consequently when these circuits are again closed the reactor flux must be built up from zero, accounting for the aforenoted slow rise in intensity of illumination of the lamps.

By connecting the resistance 11 in parallel with the contacts 8 a slight flux is maintained in the reactor which is sufficient to provide for rapid attainment of a desired intensity value, but not enough to cause overexcitation of the reactor by the controlling electromagnetic flux.

It is to be understood that a predetermined partial energization of the control winding 4 can be maintained by other means than by the resistance 11. For instance, a battery might be substituted to be connected in circuit with the winding 4 upon opening of the contacts 7 and 8.

What I claim as new and desire to secure by Letters Patent is:

1. A control system comprising, in combination, an alternating current load circuit, a variable impedance device for controlling the voltage to be impressed upon said circuit, means for varying the impedance of said device comprising a control winding supplied with current from a suitable source, voltage regulating means for varying and maintaining the voltage supplied to said control winding, switching means for said load circuit and switching means for said control winding jointly operable at will, means comprising an impedance connected in parallel with said control winding switching means, said impedance providing for a predetermined reduced energization of said control winding during deenergization of said load circuit whereby a substantially exact predetermined voltage for said load circuit is attained relatively quickly upon joint energization of said load circuit and said control winding by operation of said switching means.

2. A control system comprising, in combination, an alternating current load circuit, a variable impedance device for controlling the voltage to be impressed upon said circuit, means comprising a direct current control winding for varying the impedance of said device, regulating means for varying and maintaining the voltage supplied to said control winding, a plurality of switches jointly operable at will for simultaneously energizing said circuit and said winding, means associated with certain of said switches and operable upon opening of the latter to provide a predetermined reduced energization of said control winding during deenergization of said load circuit whereby a substantially exact predetermined voltage for said load circuit is attained within a minimum length of time upon such simultaneous energization of said circuit and said control winding.

3. A control system comprising, in combination, an alternating current load circuit, a variable impedance device for controlling the voltage to be impressed upon said circuit, means associated with said device for varying the impedance thereof comprising a direct current control winding, a potentiometer resistor for varying and maintaining the voltage supplied to said control winding, jointly operable switching means for said load circuit and said control winding, respectively, resistance means connected in parallel with said control winding switching means to provide for said control winding during deenergization of said load circuit a reduced degree of energization having a substantially predetermined proportionality to the degree of energization supplied by said potentiometer resistor, whereby a substantially exact predetermined voltage for said load circuit is attained within a minimum length of time upon energization of said circuit and said winding by operation of said switching means.

4. In an illumination control system, in combination, a group of maps to be supplied from a source of alternating current, a variable reactor for controlling the voltage to be impressed upon said lamps, means associated with said reactor for varying the impedance thereof comprising a direct current control winding, potentiometer resistance means for varying and maintaining the voltage supplied to said control winding, a plurality of jointly operable switches for controlling energization of said lamps and said control winding, means associated with certain of said switches and with said control winding and operable upon opening of the former to maintain in the latter a predetermined reduced excitation during deenergization of the lamps, whereby a predetermined voltage to be impressed upon said lamps is attained within a minimum length of time following energization of said lamps and said control winding by operation of said switching means, with a minimum of deviation from said predetermined voltage.

5. In an illumination control system, in combination, a lamp circuit to be supplied from a source of alternating current, a variable reactor connected in said lamp circuit, a control winding associated with said reactor to be supplied from a source of direct current, a variable potentiometer resistor connected in said control winding circuit, switching means for said lamp circuit and switching means for said control winding, and a resistance connected in parallel with said last mentioned switching means and in series with said potentiometer resistor and said control winding.

6. In an illumination control system, in combination, a lamp circuit to be supplied from a source of alternating current, a variable reactor for controlling the voltage of said lamp circuit, a control winding for said reactor adapted to be supplied with energy from a suitable source, variable resistance means for varying and maintaining the voltage supplied to said control winding, switching means for jointly controlling energization of said lamp circuit and tending to control energization of said control winding, means operable upon opening of said switching means to insure inclusion of a fixed amount of resistance in the control winding circuit to provide during deenergization of said lamp circuit a degree of energization of said control winding within the range of substantially one-tenth to two-thirds of the instant energization to be provided by said variable resistance means.

7. In an illumination control system, in combination, a lamp circuit to be supplied from a source of alternating current, a variable reactor for controlling the voltage of said lamp circuit, a control winding for said reactor adapted to be supplied with energy from a suitable source, variable resistance means for varying and maintaining the voltage supplied to said control winding, switching means for jointly controlling energization of said lamp circuit and tending to control energization of said control winding, means operable upon opening of said switching means to insure inclusion of a fixed amount of resistance in the control winding circuit to provide during deenergization of said lamp circuit a degree of energization of said control winding which is substantially one-fourth of the instant energization to be provided by said variable resistance means.

8. In an illumination control system, in combination, a group of lamps to be supplied from an alternating current source of constant potential, a variable reactor for controlling the illumination intensity of said lamps, a control winding for said reactor to be supplied with energy from a suitable source, a variable potentiometer resistor for varying and maintaining the voltage supplied to said control winding, a plurality of jointly operable switches controlling the continuity of circuit of said lamps and tending to control continuity of circuit of said control winding, whereby an instantaneous transition from a prevailing illumination intensity of the lamps to black out may be effected, and means associated with certain of said switches and with said control winding to insure substantially exact attainment of a predetermined illumination intensity of the lamps within a minimum length of time following energization of said lamps and a predetermined degree of energization of said control winding by operation of said switching means.

9. In an illumination control system, in combination, a group of lamps supplied from an alternating current source of constant potential, a variable reactor for controlling the illumination intensity of said lamps, means associated with said reactor for varying the impedance thereof comprising a control winding supplied from a source of direct current, voltage regulating means for varying and maintaining the voltage supplied to said control winding comprising a potentiometer resistor, jointly operable switching means for said lamps and for said control winding whereby an instantaneous transition from a prevailing illumination intensity of the lamps to black out may be effected, and a resistance connected in parallel with said control winding switching means and in series with said potentiometer resistor and said control winding whereby a predetermined illumination intensity of the lamps is substantially exactly attained within a minimum length of time following energization of said lamps and said control winding by operation of said switching means.

10. In an illumination control system, in combination, a lamp circuit to be supplied with energy from a suitable source, a variable reactor connected in said lamp circuit, a control winding for varying the impedance of said reactor and adapted to be supplied with energy from a suitable source, a variable impedance connected in said control winding circuit, a plurality of switches operable jointly and adapted when closed to simultaneously energize said lamp circuit and effect a predetermined degree of energization of said control winding circuit, and means operable upon opening of said switches to insure inclusion of a fixed amount of resistance in said control winding circuit in series with said variable impedance, for the purpose set forth.

11. In an illumination control system, in combination, a lamp circuit to be supplied with energy from a suitable source, a variable reactor connected in said lamp circuit, a control winding for varying the impedance of said reactor and adapted to be supplied with energy from a suitable source, a variable impedance connected in said control winding circuit, a plurality of switches operable jointly and adapted when closed to simultaneously energize said lamp circuit and effect a predetermined degree of energization of said control winding circuit, and means operable upon opening of said switches to insure inclusion in said control winding circuit in series with said variable impedance of a fixed amount of resistance of substantially greater value than the total value of said variable impedance, for the purpose set forth.

RICHARD B. HUNTER.